Patented Oct. 14, 1952

2,614,123

UNITED STATES PATENT OFFICE 2,614,123

1-ACETYL-6-OXO-8a-METHYL-3,4,6,7,8,8a-HEXAHYDRONAPHTHALENE

Melvin S. Newman and Sambasiva Swaminathan, Columbus, Ohio, assignors to The Ohio State University Research Foundation, Columbus, Ohio, a corporation of Ohio No Drawing. Application August 21, 1951, Serial No. 242,982

1 Claim. (Cl. 260—586)

The invention disclosed in this application relates to new compositions of matter.

The object of this invention is to produce a new composition of matter consisting of a 1-acetyl-6-oxo-8a-methyl-3,4,6,7,8,8a - hexahydronaphthalene.

This new compound is useful as an intermediate for the total synthesis of steroids and so far as we know has never heretofore been conceived or synthesized. As a starting point for this compound we can use 8a-methyl-1,2,3,4,6,7,-8,8a-octahydro-1-ethynyl - 1 - hydroxy - 6 - oxonaphthalene. This starting compound is disclosed and the process making it is disclosed in application for U. S. Patent Serial No. 218,410. In order to produce the new composition of matter we react the above described starting material with formic acid by dissolving it in formic acid. The starting compound has a formula as follows:

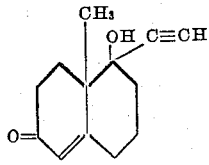

The resulting compound has a formula as follows:

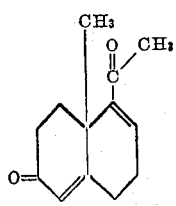

It will be noted that not only are the ethynyl and hydroxyl radicals

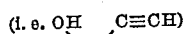

converted into the acetyl radical

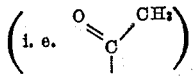

but also the 1 and 2 carbons become unsaturated through the introduction of a double bond between them.

Following is an example of the process we have used to produce our novel composition of matter.

EXAMPLE

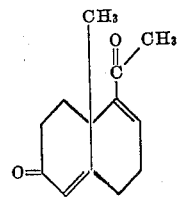

1-acetyl-6-oxo-8a-methyl-3,4,6,7,8,8a-hexahydronaphthalene IX

A solution of 8a-methyl-1,2,3,4,6,7,8,8a-octahydro-1-ethynyl-1-hydroxy - 6 - oxonaphthalene (1.2 g.) in formic acid (15 ml., 92.5%) was refluxed for forty-five minutes. At the end of this period, the solution had turned to a deep purple color and the excess formic acid was removed in vacuo. The viscous residue was dissolved in ethanol (50 ml.), decolorized with carbon and the alcoholic solution concentrated in vacuo. The residue after chilling in ice and trituration with ether afforded a solid material which was crystallized from ether containing a small amount of ethanol; yield, 350 mg.; M. P. 143–145°.

After a similar recrystallization, the product melted at 145.5–147°, and was analyzed.

Analysis:
    Calcd. for $C_{13}H_{16}O_2$: C, 76.4; H, 7.9
    Found: C, 76.1, 76.3; H, 7.6, 7.7

It is to be understood that modifications of this compound coming within the scope of the invention are intended to be covered by the claim hereof.

We claim:

A composition of matter consisting of 1-acetyl-6-oxo-8a - methyl - 3,4,6,7,8,8a - hexahydronaphthalene.

MELVIN S. NEWMAN.
SAMBASIVA SWAMINATHAN.

REFERENCES CITED

The following references are of record in the file of this patent:

Friedman et al., Chemistry and Industry, Sept. 15, 1951, pp. 777–8.